(12) United States Patent
Dean et al.

(10) Patent No.: US 8,274,726 B2
(45) Date of Patent: Sep. 25, 2012

(54) METHOD FOR UTILIZING PROPERTIES OF THE SINC(X) FUNCTION FOR PHASE RETRIEVAL ON NYQUIST-UNDER-SAMPLED DATA

(75) Inventors: Bruce H. Dean, New Market, MD (US); Jeffrey Scott Smith, Baltimore, MD (US); David L. Aronstein, Silver Spring, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 249 days.

(21) Appl. No.: 12/839,171

(22) Filed: Jul. 19, 2010

(65) Prior Publication Data
US 2012/0013965 A1    Jan. 19, 2012

(51) Int. Cl.
*G02B 26/00*    (2006.01)
*G06F 15/00*    (2006.01)

(52) U.S. Cl. ......... 359/239; 359/900; 708/403; 708/405
(58) Field of Classification Search ................. 359/239, 359/900; 708/400, 403, 405
See application file for complete search history.

*Primary Examiner* — Jack Dinh

(57) ABSTRACT

Disclosed herein are systems, methods, and non-transitory computer-readable storage media for simulating propagation of an electromagnetic field, performing phase retrieval, or sampling a band-limited function. A system practicing the method generates transformed data using a discrete Fourier transform which samples a band-limited function f(x) without interpolating or modifying received data associated with the function f(x), wherein an interval between repeated copies in a periodic extension of the function f(x) obtained from the discrete Fourier transform is associated with a sampling ratio Q, defined as a ratio of a sampling frequency to a band-limited frequency, and wherein Q is assigned a value between 1 and 2 such that substantially no aliasing occurs in the transformed data, and retrieves a phase in the received data based on the transformed data, wherein the phase is used as feedback to an optical system.

18 Claims, 13 Drawing Sheets

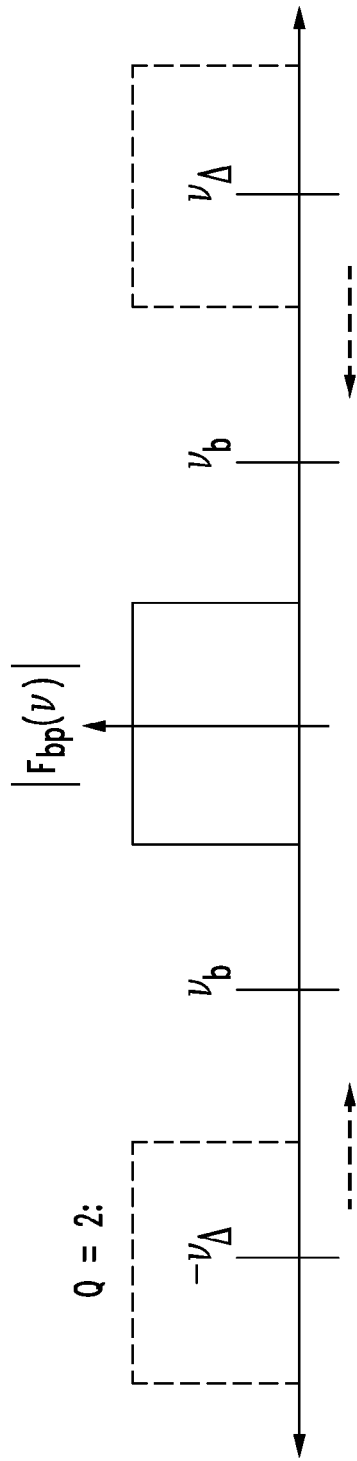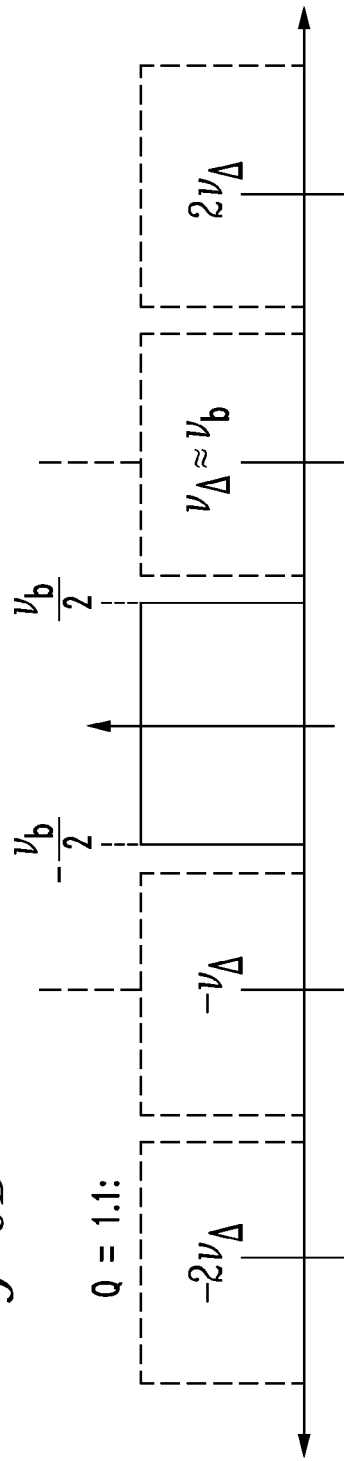
FIG. 6A
FIG. 6B

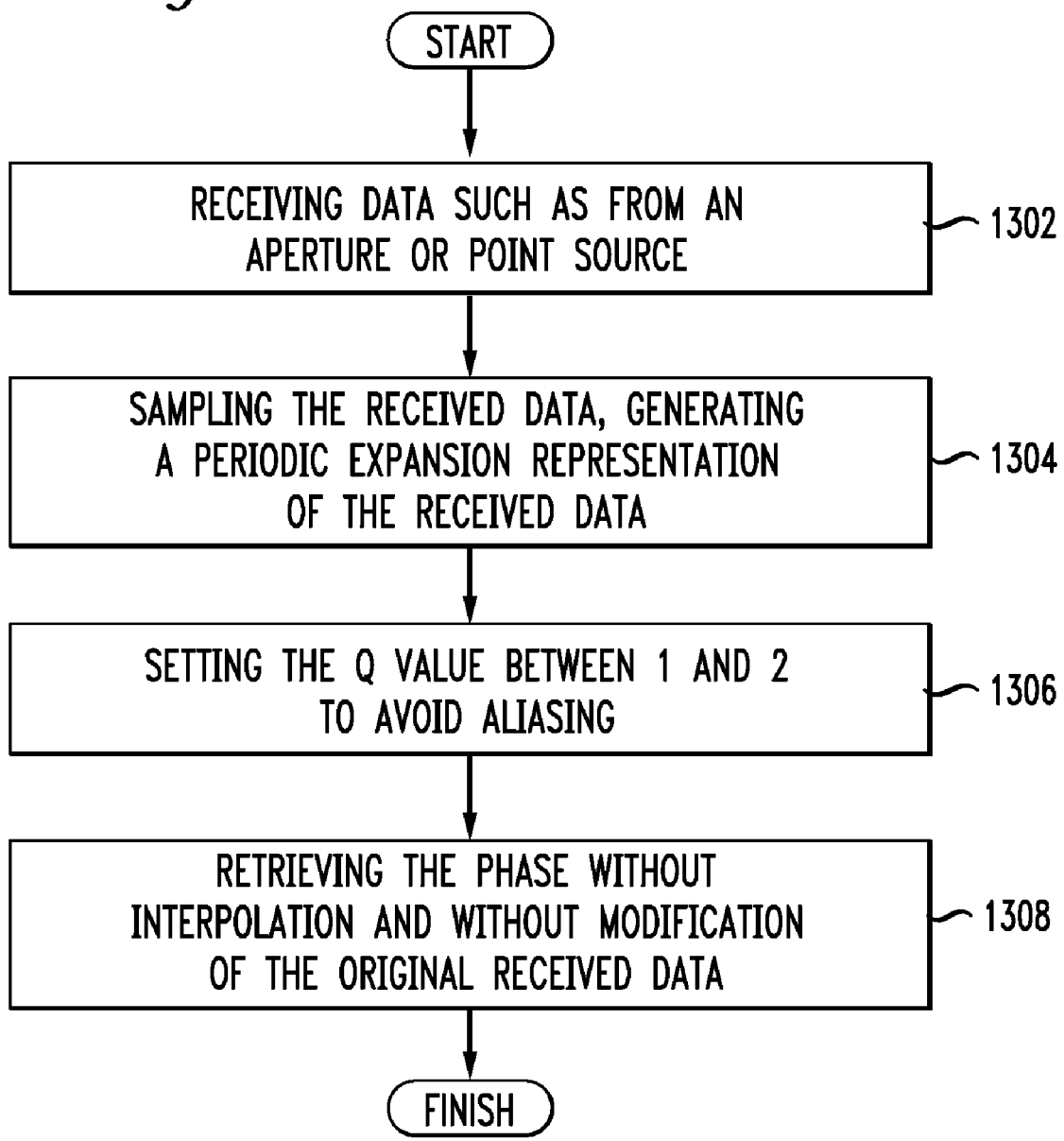

METHOD FOR UTILIZING PROPERTIES OF THE SINC(X) FUNCTION FOR PHASE RETRIEVAL ON NYQUIST-UNDER-SAMPLED DATA

BACKGROUND

1. Technical Field

The present disclosure relates to phase retrieval and more specifically to sampling and reconstruction of the sinc(x) function using phase retrieval.

2. Introduction

Broadly speaking, phase retrieval is a process used to retrieve an optical pupil phase and pupil amplitude based on images of a known object received via an optical system. The phase and amplitude of an optical system are synonymous with aberrations, misalignments, or imperfections in the optical system. Two general algorithm approaches are commonly utilized for phase retrieval. One approach is parametric based and the other is iterative-transform based. A number of variations of both approaches have been developed, such as incorporating diversity functions and one or more diversity images. However, these approaches introduce an aliasing effect in the resulting image data, and otherwise suffer from phase-wrapping discontinuities, ambiguous convergence to solutions, and estimation bias due to imperfect knowledge of the diversity function. What is needed in the art is an improved way to perform phase retrieval that avoids aliasing.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Phase retrieval is a process used to recover an optical phase and amplitude, synonymous with aberrations, misalignments, or imperfections in an optical system, using images of a known object. The application of this technology can made to optical systems metrology, telescope control and alignment, optical wavefront sensing and control, and can be pertinent to adaptive optical systems for astronomical observing, security, and surveillance imaging.

The approach disclosed herein takes advantage of sampling considerations for a band-limited function. The Fourier transform of this sampled, band-limited function is constructed by periodic extension, i.e. spacing the copies in a definite way, such that minimal aliasing occurs for $1<Q<2$. Q is the sampling ratio, which in turn is the ratio of the sampling frequency to the band-limited frequency. In optical systems, the sampling ratio is referred to as the image sampling parameter and can be specified by $Q=(lambda*f/\#)/dx$. Lambda is the assumed monochromatic wavelength of the scalar electromagnetic field used to form the image being sampled, $f/\#$ is the f-number of the optical system, and dx is the image-plane sampling interval, or pixel size.

There is a distinction in optics that electric fields should be sampled with $Q>=1$ to avoid aliasing, but that the irradiance measured by light detectors should be sampled with $Q>=2$ to avoid aliasing. This disclosure shows how phase retrieval can be performed with minimal aliasing for $Q>=1$, despite the fact that it makes use of irradiance data that would need $Q>=2$ to be interpolated without aliasing.

The analysis considered here begins with the band-limited sinc(x) function and demonstrates that the sinc(x) function can be interpolated exactly using the Whittaker-Shannon sampling theorem for sampling ratios $Q>=1$. This interpolation is possible because of the extra space that exists between repeated copies of the sinc(x) function's Fourier transform created by periodic extension. Using the band-limited property of the sinc(x) function and of the complex amplitude of the optical point-spread function, propagation of the electromagnetic field can be simulated with no aliasing using the discrete Fourier transform (DFT) with $1<Q<2$. Thus, phase retrieval can be performed with minimal aliasing on under-sampled point spread function (PSF) data, for sampling ratios $2>Q>=1$.

Disclosed are systems, methods, and non-transitory computer-readable storage media for simulating propagation of a monochromatic, scalar electromagnetic field, performing phase retrieval, and sampling a band-limited function. A system practicing the method generates transformed data using a discrete Fourier transform which samples a band-limited function f(x) without interpolating or modifying received data associated with the function f(x), wherein an interval between repeated copies in a periodic extension of the function f(x) obtained from the discrete Fourier transform is associated with a sampling ratio Q, defined as a ratio of a sampling frequency to a band-limited frequency, and wherein Q has a value between 1 and 2 such that substantially no aliasing occurs in the transformed data, and retrieves a phase from the received data based on the received data and the transformed data. The phase can optionally be used as feedback to an optical system. The interval between repeated copies in a periodic extension of f(x) is associated with a sampling ratio Q, a ratio of sampling frequency to band-limited frequency. The system assigns Q a value between 1 and 2 so the discrete Fourier transform has substantially no aliasing, and retrieves a phase based on the received data and the transformed data. The phase can serve as feedback to tune, align, or otherwise correct an optical system.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 6A and 6B illustrate an example idealized periodic extension $F_{bp}(v)$;

FIG. 13 illustrates a second example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for performing phase retrieval without introducing aliasing effects into the results. A system, method and non-transitory computer-readable media are disclosed which simulate propagation of an electromagnetic field, perform phase retrieval, or sample a band-limited function. A system practicing the method generates transformed data using a discrete Fourier transform which samples f(x) without interpolating or modifying received data associated with a band-limited function f(x). The interval between repeated copies in a periodic extension of f(x) is associated with a sampling ratio Q, a ratio of sampling frequency to band-limited frequency. A discussion of a basic general purpose system or computing device in FIG. 1 which can be employed to practice the concepts is disclosed herein. A more detailed description of the methods and algorithms, and other variations will then follow. The disclosure now turns to FIG. 1.

Figure 1:
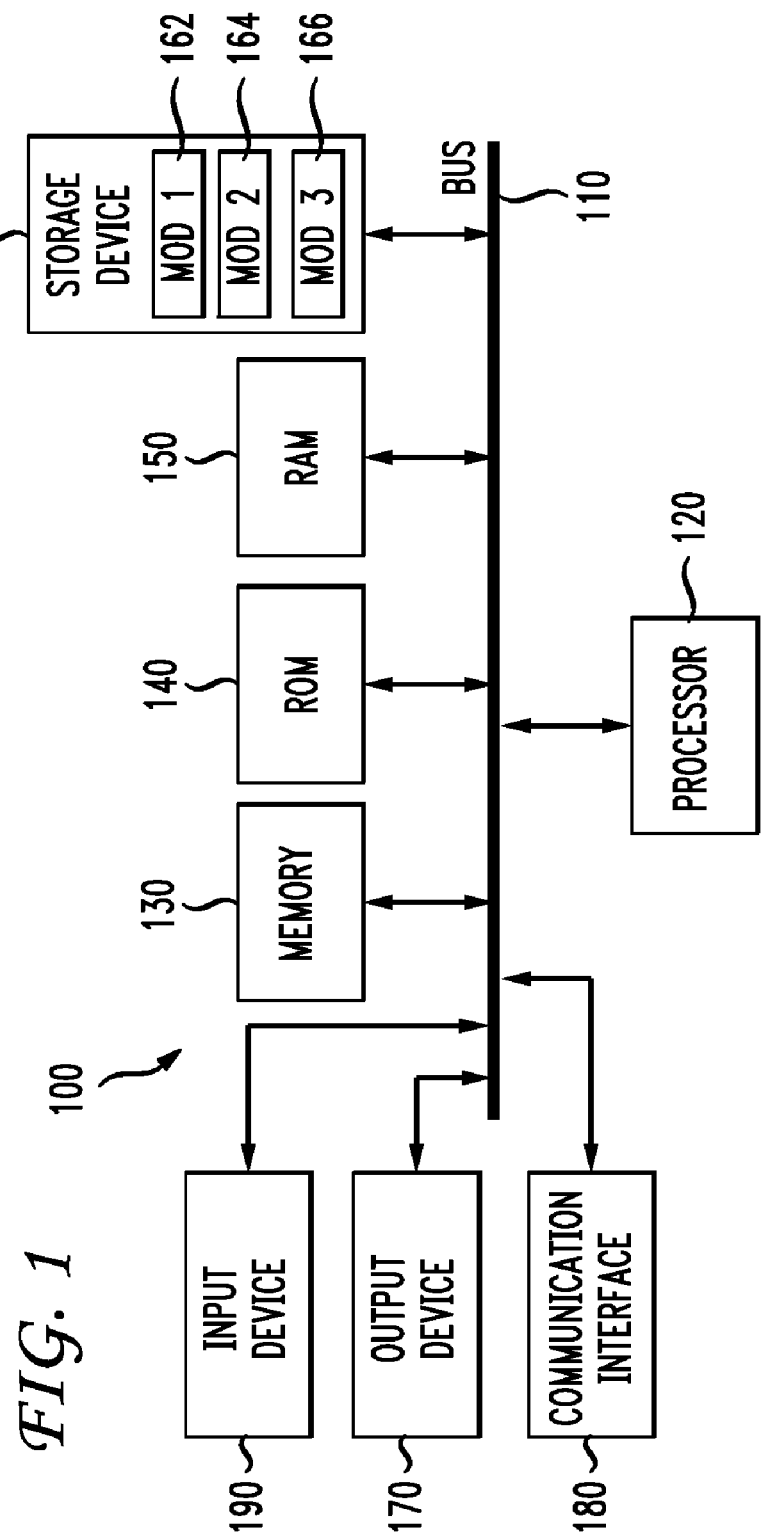
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed a basic computing device which can practice the method, the disclosure now turns to a discussion of sampling and reconstruction of the sinc(x) function.

For the propagation of electromagnetic fields calculated as the Fourier transform of a general pupil geometry, this approach can exploit some special qualities of the electric field Fourier transform, F, to minimize aliasing, or non-uniqueness of the Fourier transform. In particular, the Fourier transform of a sampled, band-limited function can be made periodic by applying a "periodic extension" in Fourier analysis. Thus the sampled, band-limited function can be expressed as a Fourier series. The periodic replicas of F have minimal overlap, and therefore exhibit no aliasing for values of Q>=1. This result differs from the conventional viewpoint in phase retrieval that Q must be greater than or equal to 2 when the data (images, which are measurements of the irradiance at the detector) are not modified or interpolated. This disclosure demonstrates how the Fourier transform of a sampled, band-limited optical function can be periodically extended in a way that minimizes aliasing. Thus, phase retrieval can be implemented in a way that minimizes aliasing by an appropriate choice of sampling variables for constructing the Fourier transform by periodic extension.

The sampling theorem can be derived in a way that emphasizes two assumptions of the theorem explicitly. For example, the theorem can be expressed in terms of two length scales that are derived from the data sampling frequency, $v_\Delta$, and the data band-limited frequency $v_b$. With the substitution $Q \equiv v_b / v_\Delta$, the results can be expressed by the following function:

$$f(x) = \frac{2}{Q} \sum_{n=-\infty}^{+\infty} f(x_n) \mathrm{sinc}\left[\frac{2}{Q}\left(n - \frac{x}{\Delta x}\right)\right] \quad (1)$$

$$= \frac{2}{Q} \sum_{n=-\infty}^{+\infty} f(x_n) \mathrm{sinc}[2v_b(x_n - x)]$$

or $$f(x)|_{Q \to 2} = \sum_{n=-\infty}^{+\infty} f(x_n) \mathrm{sinc}(n - x/\Delta x) \quad (2)$$

$$= \sum_{n=-\infty}^{+\infty} f(x_n) \mathrm{sinc}[v_\Delta(x_n - x)]$$

Equation (2), with Q=2, is the standard form of Equation (1) (Whittaker-Shannon sampling theorem). The derivation leading to Equation (1) can lead to an alternative way of looking at the problem. The preferred basis set for interpolation can be found by varying the frequency component of the basis functions to minimize the side lobe artifacts in the superposition of the weighted basis functions. Some examples comparing Equations (1) and (2) for the "canonical" sinc2 (x) function can illustrate the results. However, special functions exist where $Q \in (1,2]$ is perfectly valid and no aliasing occurs. Indeed, one such example is the sinc(x) function. Examining the sinc(x) function is instructive because its coverage in frequency space is half that of the $\mathrm{sinc}^2(x)$ function, and therefore, some subtleties exist in the relationship between its sampled bandpass and its continuous bandpass. By making this distinction, the generality of the analysis is made explicit. Some numerical examples are also discussed to give some basic insight into the sampled sinc(x) function in the context of the Whittaker-Shannon-Kotelnikov (WSK) assumptions.

Some further examples of "sampling" in this context are of interest from the perspective of scalar diffraction theory since the focal plane electric field can be modeled in each of the two transverse dimensions using the sinc(x) function.

Figure 2A:
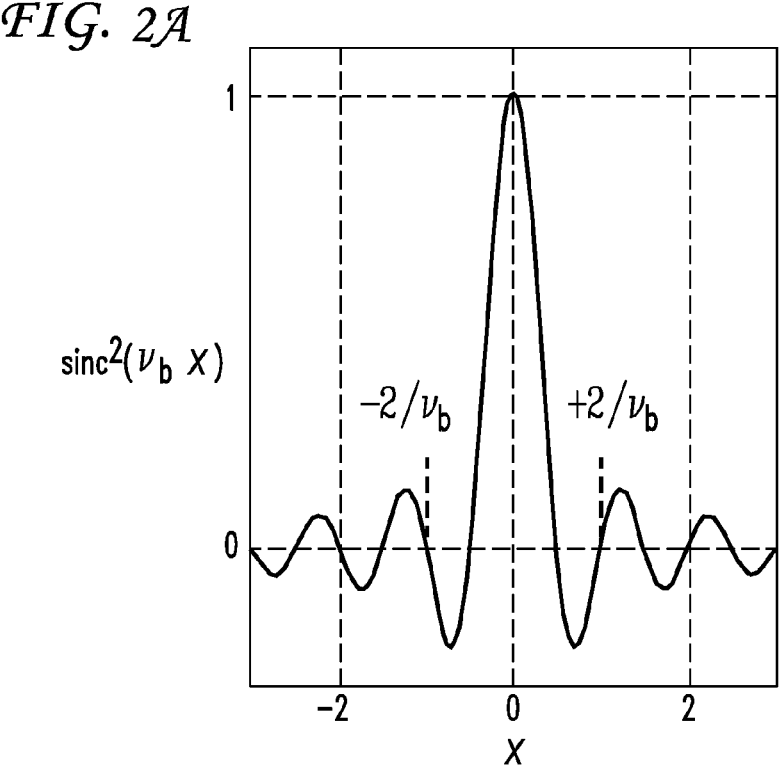
FIGS. 2A and 2B illustrate exemplary functions for continuous $sinc(v_b x)$ and $rect(v,v_b)/v_b$ for $v_b=2$.
Figure 2B:
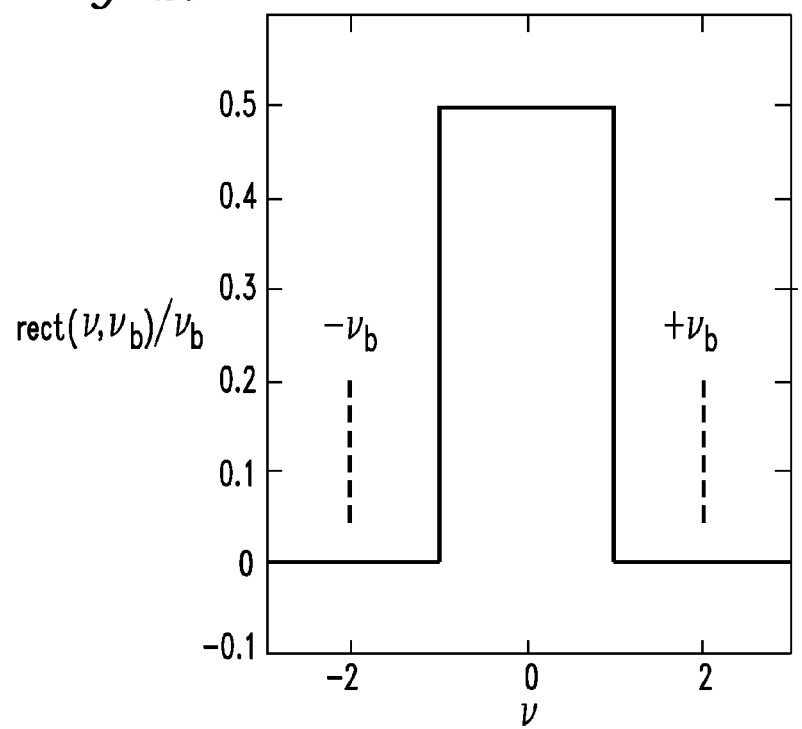

The "continuous" results emphasize the role of sampling. The convention adopted here is that x is the spatial variable and the sinc($v_b$x) function is defined by $$f(x) = \mathrm{sinc}(v_b x) = \frac{\sin(\pi v_b x)}{\pi v_b x} \quad (3)$$

where $v_b$ is the band-limited frequency specifying the non-zero extent of the Fourier transform. The Fourier transform $\mathfrak{F}$ of Equation (3) is given by the scaled rect(x) function below:

$$F_b(v) = \mathfrak{F}\{\mathrm{sinc}(v_b x)\} \quad (4)$$

$$= \frac{1}{v_b} \mathrm{rect}(v, v_b)$$

$$= \begin{cases} 1/v_b, & \text{for } |v| \le v_b/2 \\ 0, & \text{otherwise} \end{cases}$$

with plots of Equations (3) and (4) shown in FIGS. 2A and 2B for $v_b=2$, noting that the spatial period associated with $v_b$ in this case is given by $2/v_b=1$. FIGS. 2A and 2B illustrate exemplary functions for continuous sinc($v_b$x) and rect(v,$v_b$)/$v_b$ for $v_b=2$. A slightly different notation is used here for the rect function than the standard form. Specifically, a two-parameter form, rect(x, y), is used over the usual notation of rect(x/y) to avoid confusion when scaling and using dimensionless variables.

For reference, the Fourier transform convention adopted here is shown below:

$$F(v) = \mathfrak{F}\{f(x)\} = \int_{-\infty}^{+\infty} dx f(x) e^{-i2\pi v x} \quad (5)$$

and its inverse:

$$f(x) = \mathfrak{F}^{-1}\{F(v)\} = \int_{-\infty}^{+\infty} dv F(v) e^{i2\pi x v} \quad (6)$$

The main assumptions from classical sampling theory are summarized succinctly in terms of two main conditions. First, f(x) is band-limited:

$$F_b(v) = \Im\{f(x)\} = 0 \text{ for } v \notin [-v_b, v_b] \text{ and } |v_b| < \infty \quad (7)$$

Second, $F_{bp}(v)$ is constructed by periodic extension over the sampling interval $v_\Delta$:

$$F_{bp}(v) = F_b(v + n v_\Delta), \text{ with } v_\Delta = 1/\Delta x, \text{ for } \forall v \in \mathbb{R} \text{ and } n = 0, 1, 2, \ldots \quad (8)$$

By application of Equation (8), $F_{bp}(v)$ can be calculated using a Fourier series expansion in $v_\Delta$ as shown below:

$$F_{bp}(v) = \sum_{n=-\infty}^{+\infty} c_n e^{-i 2\pi v n (1/v_\Delta)} \equiv \sum_{n=-\infty}^{+\infty} c_n e^{-i 2\pi v (n \Delta x)} \quad (9)$$

The construction in Equation (9) is not computable in practice and so when using a finite number of terms the discrete Fourier series (DFS) below $$F_{bp,N}(v) = \sum_{n=0}^{N-1} c_n e^{-i 2\pi v n'(n)/v_\Delta} \equiv \sum_{n=0}^{N-1} c_n e^{-i 2\pi v n'(n) \Delta x} \quad (10)$$

where $$n'(n) = \left[-\frac{1}{2}(N-1), \ldots, +\frac{1}{2}(N-1)\right] \quad (11)$$

maps the index range over N total points including values of $x < 0$ for $x \geq 0$, $n'(n)$ can be defined as $n'(n) = [0, 1, 2, \ldots, N-1]$. Note that Equation (11) is not the only choice. Another option is given below:

$$n'(n) = \left[-\frac{1}{2}N, \ldots, +\frac{1}{2}(N-1)\right] \quad (12)$$

Figure 3:
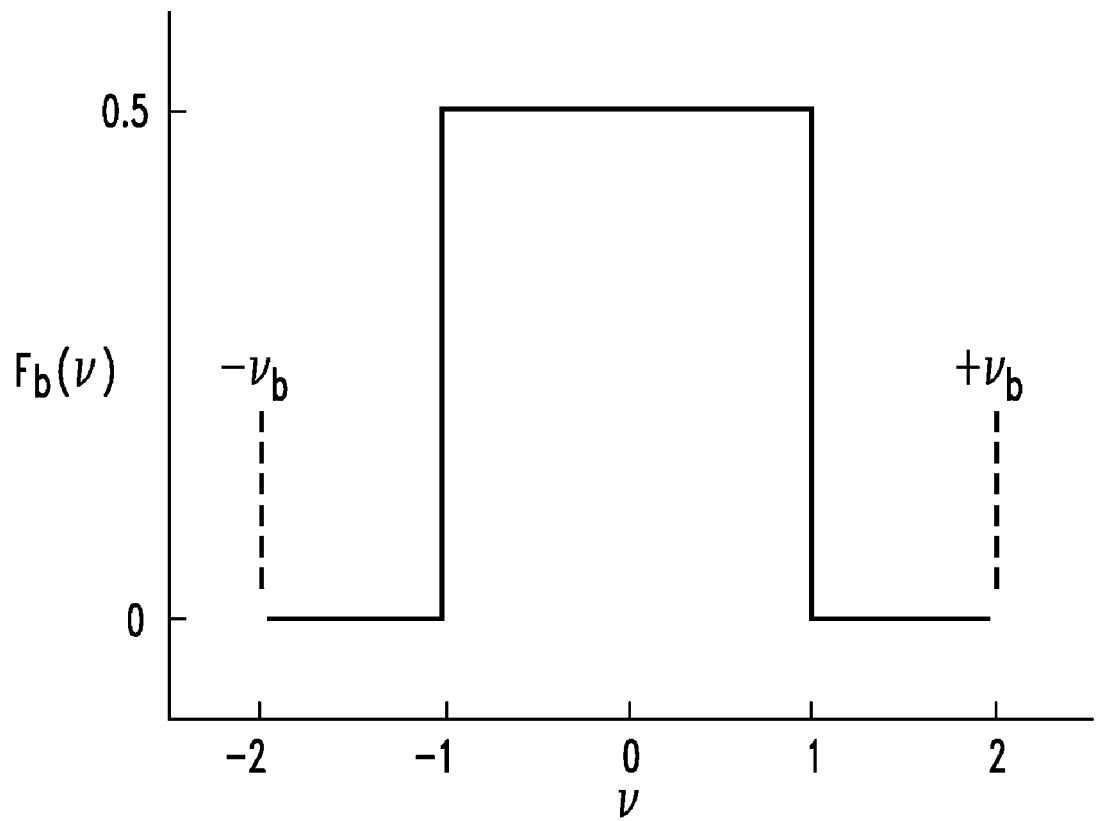
FIG. 3 illustrates an exemplary continuous Fourier transform for $sinc(v_b x)$ for $v_b=2$.

The disclosure now turns to a periodic extension of the sampled sinc function. By inspection of the exemplary continuous Fourier transform for $f(x) = \text{sinc}(v_b x)$ for $v_b = 2$ as shown in FIG. 3, $F_b(v) = \text{rect}(v, v_b)/v_b$ is only non-zero over $|v'_b| \leq v_b/2$ and is the continuous result. In sampling the f(x) function, $v_\Delta$ is introduced which determines how the repeated copies of the $F_b(v)$ are placed with respect to $v_b$. So when constructing the $F_{bp}(v)$ by periodic extension, or when f(x) is physically sampled (such as when f(x) is a measured data signal and is sampled by a physical detection process) and the Fourier transform is then applied to this sampled data, the interval for periodic extension is defined by $v_\Delta = Q v_b$. This interval defines the spacing between the repeated copies of the $F_b(v)$, and is helpful to understanding the true bandpass, $v_b$, of the $\text{sinc}(v_b x)$ function, and its apparent bandpass, $v'_b$. Equation (10) can be alternatively expressed in terms of Q:

$$F_{bp,N}(v) = \sum_{n=0}^{N-1} c_n e^{-i 2\pi v n'(n)/(Q v_b)} \equiv \sum_{n=0}^{N-1} c_n e^{-i 2\pi v n'(n) x_b/Q} \quad (13)$$

Continuing the calculation produces the Fourier coefficients $c_n$ in Equation (10) that are given by (see Appendix A):

$$c_n = \frac{\text{sinc}(n/Q)}{v_\Delta} \quad (14)$$

and therefore the "periodically extended" $\text{rect}(v, v_b)/v_b$ function is approximated for finite N as $$F_{bp}(v) = \frac{1}{v_\Delta} + \frac{2}{v_\Delta} \sum_{n=1}^{N-1} \text{sinc}(n/Q) \cos(2\pi n v / v_\Delta) \quad (15)$$

To illustrate, consider the situation for Nyquist sampling and arbitrarily choose $v_b = 2$:

$$Q = v_\Delta/v_b = v_\Delta/2 = 2 \Rightarrow v_\Delta = 4 \Rightarrow \Delta x = \frac{1}{4} \quad (16)$$

Figure 4A:
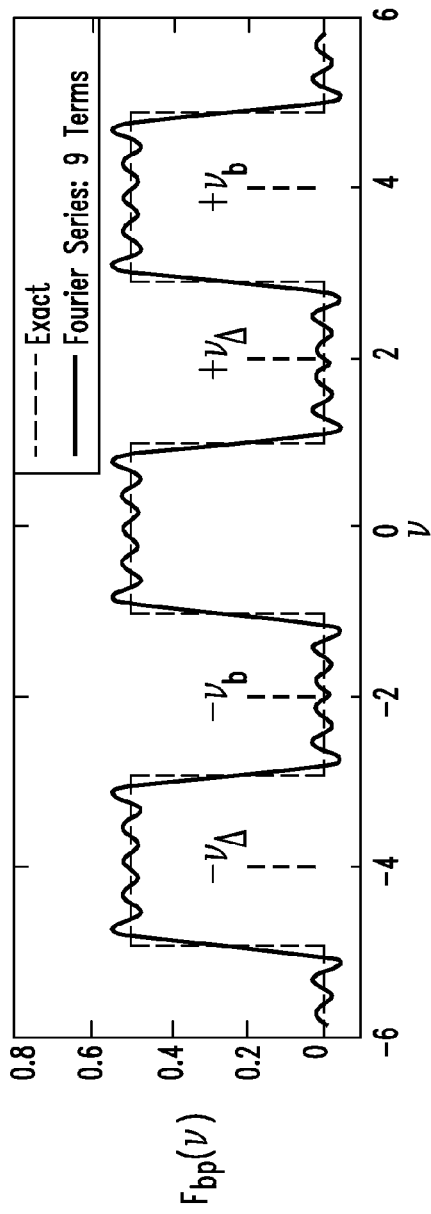
FIGS. 4A and 4B illustrate an exemplary periodic extension for Nyquist sampling for N=9 terms and N=51 terms.
Figure 4B:
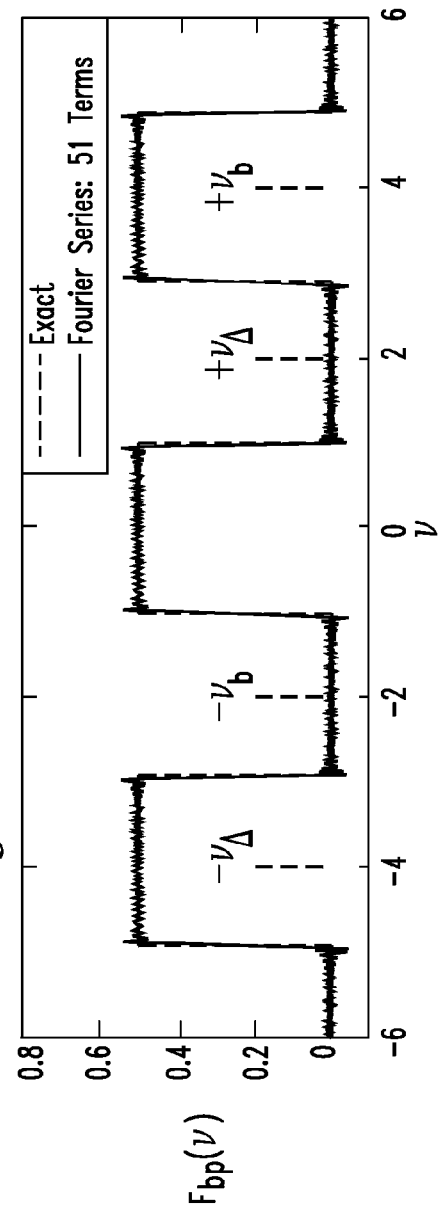

FIGS. 4A and 4B illustrate an exemplary periodic extension for Nyquist sampling for N=9 terms and N=51 terms. The DFS expansion shown in Equation (15) is shown in FIG. 4A for N=9 terms, and for comparison, the approximation shown in FIG. 4B is for N=51 terms. A prominent feature is the oscillating nature of the Fourier series due to the truncation of terms in going from Equation (9) to Equation (10). This ringing effect is the Gibbs phenomena. In summary of FIGS. 4A and 4B, the periodic extension of $F_b(v)$ is calculated using the DFS via Equation (10).

Figure 5A:
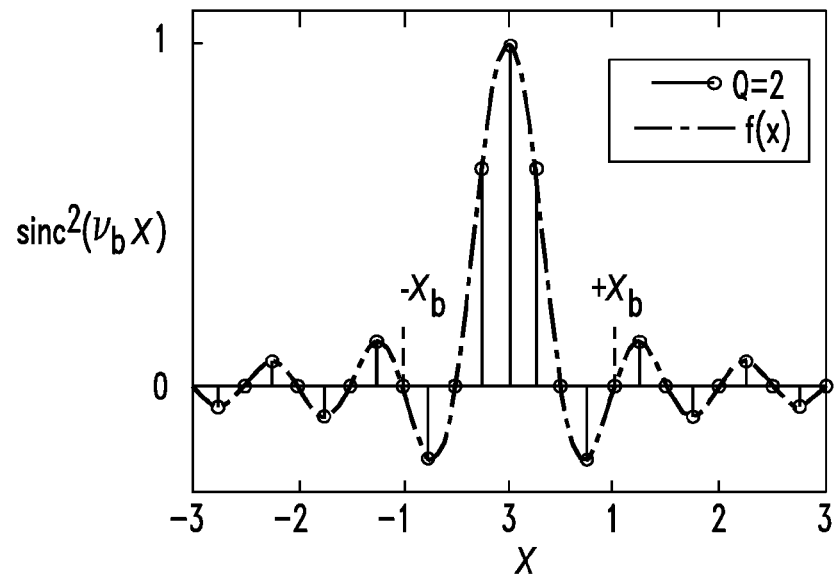
FIGS. 5A and 5B illustrate an exemplary periodic extension for Nyquist sampling FFT of sampled $sinc(v_b x)$.
Figure 5B:
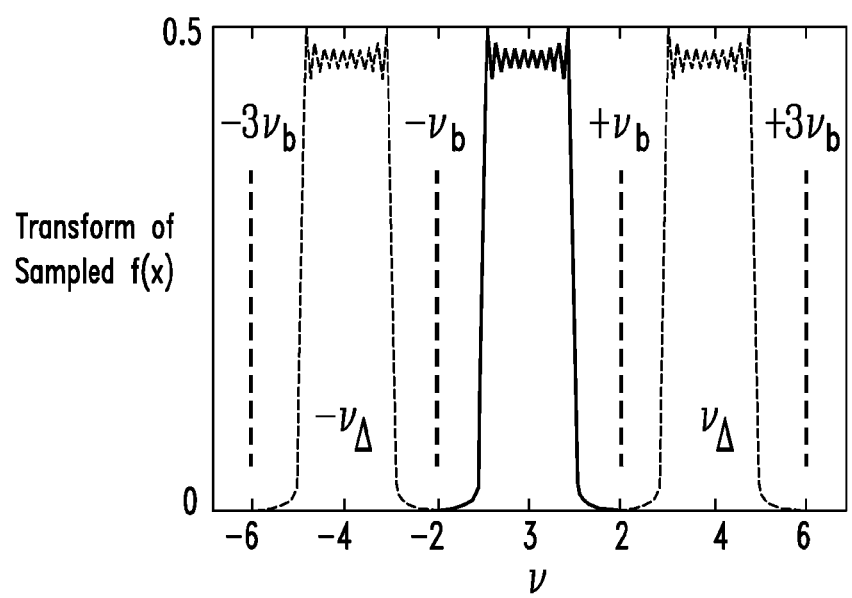

Equivalently, the transform of the data is calculated directly by Fourier transforming the sampled $\text{sinc}(v_b, x)$ function using the Fast Fourier Transform (FFT), rather than by the DFS expansion. The DFT can also be used to derive from the fundamental period of the DFS. For comparison, this calculation is shown in FIGS. 5A and 5B. FIGS. 5A and 5B illustrate an exemplary periodic extension for Nyquist sampling FFT of sampled $\text{sinc}(v_b x)$, noting that the Gibbs ringing can be made arbitrarily small (but never zero) as discussed below with respect to minimal aliasing for $Q \approx 1$.

Figure 7:
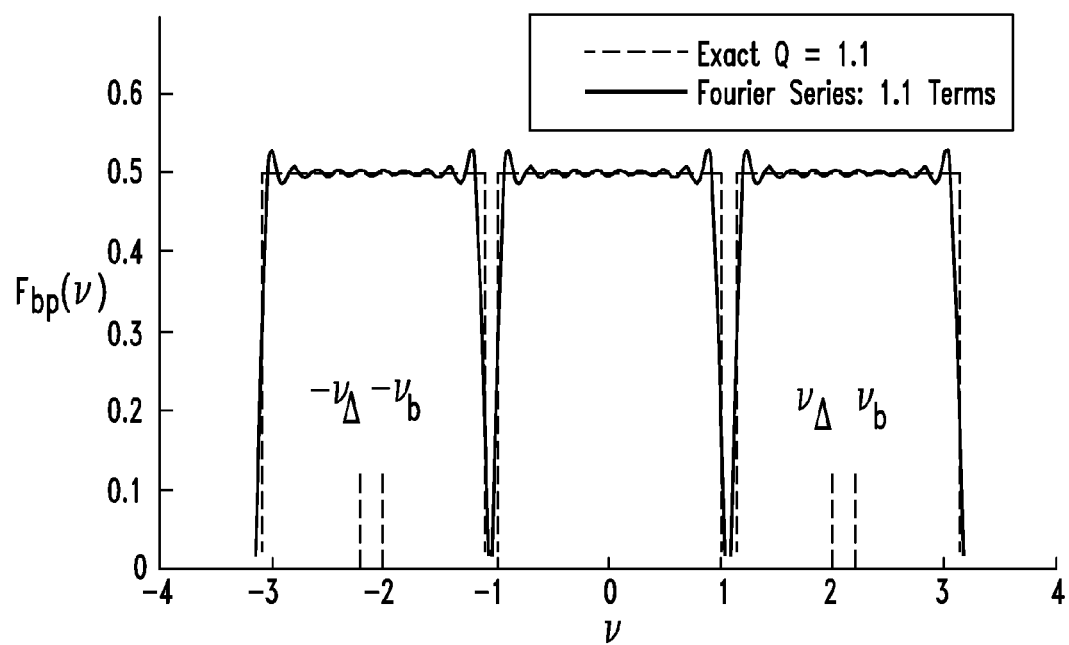
FIG. 7 illustrates an example periodic extension $F_{bp}(v)$.

Next the disclosure turns to a discussion of special functions that exist where $Q \in (1, 2]$ which are perfectly valid and in which no aliasing occurs. FIGS. 6A and 6B illustrate an example idealized periodic extension $F_{bp}(v)$. FIG. 6A shows a Nyquist sampled version of the idealized periodic extension $F_{bp}(v)$. This idealized construction shows that no overlap occurs between neighboring copies of the repeated $F_b(v)$, for all $Q \geq 1$, therefore no aliasing is present. Note, however, that this statement is only valid for the idealized case with no truncation error. In practice, the data is "windowed" or truncated leading to Gibbs "ringing" and therefore no matter how small, these errors always "interfere" at some level in the space between the gaps of the $F_{bp}(v)$. To further illustrate Equation (10) (or its specific result, Equation (15)), the calculation is shown in FIG. 7 for Q=1.1 and N=11.

Q can be made as close to 1 as desired, limited only by available computer memory or other computational factors. Q in turn dictates the window size of the data. Truncation can also occur due to the finite extent of the detector. Some additional implications are discussed below.

The disclosure now turns to Whittaker-Shannon-Kotelnikov (WSK) reconstruction. As disclosed above, the sampled $\text{sinc}(v_b x)$ function can be interpolated to arbitrary precision for $Q \geq 1$. Nevertheless, it is instructive to demonstrate the reconstruction for a specific numerical example. Continuing with the example choosing Q=1.1 and $v_b = 2$, the associated quantities for the data sampling frequency and the sample spacing are $$Q = v_\Delta/v_b = v_\Delta/2 = 1.1 \Rightarrow v_\Delta = 2.2 \Rightarrow \Delta x \approx 0.45 \quad (17)$$

The WSK interpolation formula shown in Equation (2) is then applied to reproduce f(x) from a set of N=23 uniformly sampled data values. The sample points of f(x) are $x_n = n \Delta x$ and marked by the vertical dashed lines in FIG. 8. The WSK result produces the interpolated function values, $f(x'_m)$, shown in the figure at points $x'_n = m\Delta x'$ for 221 points for $|x|<=2.5$, marked by circles and separated along the x-axis.

Figure 8:
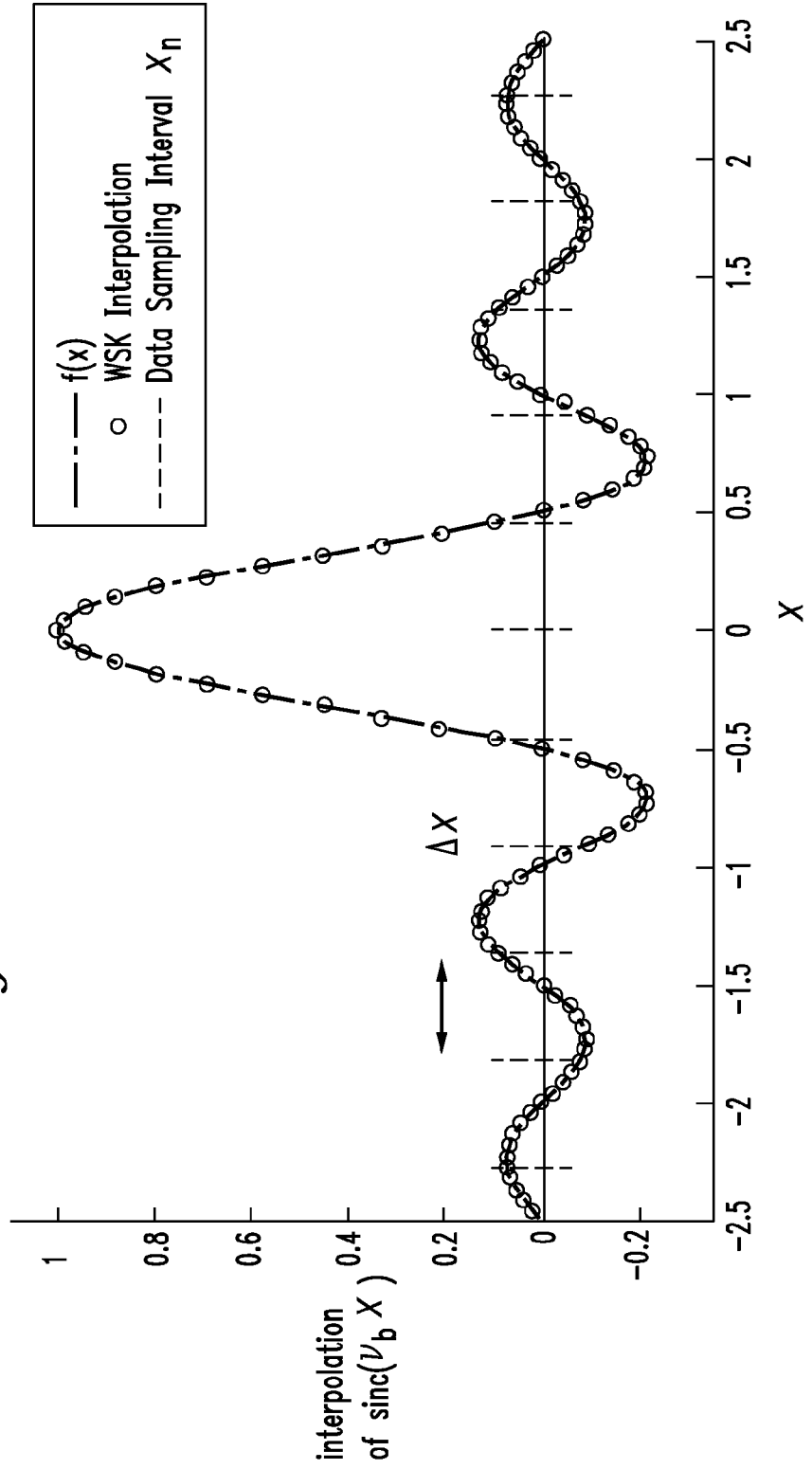
FIG. 8 illustrates an exemplary Whittaker-Shannon-Kotelnikov (WSK) interpolation for Q=1.1 and N=23.
Figure 9:
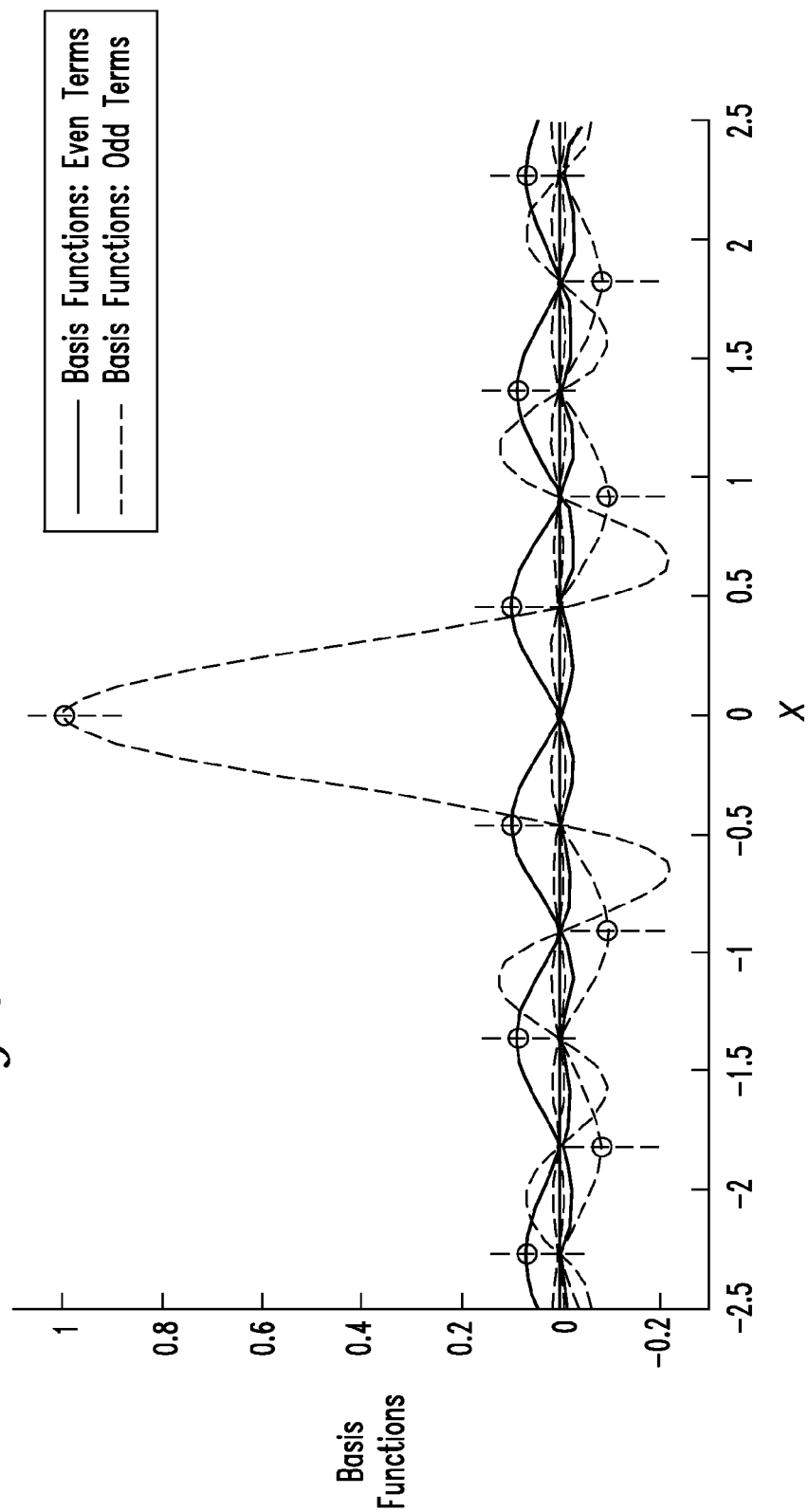
FIG. 9 illustrates an exemplary weighted basis function for Q=1.1 and N=23.

The weighted sinc(x) basis functions are distributed across a number of the data sample points and are shown in FIG. 9. The sum of the data sample points in FIG. 9 gives the result shown in FIG. 8. In summary, a $Q>=1$ sampled $\text{sinc}(v_b x)$ function can be reconstructed to arbitrary precision. FIG. 8 shows that a good approximation can be achieved using just a modest number of 23 data sample points. The RMS error between $f(x)=\text{sinc}(v_b x)$ and its interpolated counterpart is calculated in units normalized to one, as shown below:

$$\text{RMS}[f(x) - f_{WSK}(x)] = 2.6 \times 10^{-3} \tag{18}$$

The disclosure will now provide a phase-retrieval example. The $\text{sinc}(v_b x)$ function has be interpolated to arbitrary accuracy using the WSK theorem for all $Q>=1$. FIGS. 6A and 6B shows that this ability is due to the extra "space" that exists between copies of the neighboring, $F_b(v) = \text{rect}(v, v_b)/v_b$, created by periodic extension, which in turn is implied by sampling. Similarly, this observation suggests that phase retrieval can be performed on under-sampled data, with $1<=Q<2$, by identifying the focal plane electric field in each transverse dimension with $\text{sinc}(v_b x)$ function. The disclosure will demonstrate some of these details and results for an iterative-transform class of phase-retrieval algorithms.

The application to phase retrieval proceeds by identification of $\text{sinc}(v_b x)$ with the focal plane electric field in each transverse dimension. Thus, the Fourier conjugate of the exit pupil amplitude is $F_b(v) = \text{rect}(v, v_b)/v_b$ in each transverse dimension. In one implementation, the phase-retrieval algorithm uses a discrete Fourier transform (DFT) propagator in combination with an iterative-transform type phase-retrieval algorithm, specifically an implementation of the Misell-Gerchberg-Saxton algorithm. A phase retrieval approach using values of $Q>\approx 1$ can be used.

The discrete or "aliased" version of the Fourier transform can be derived from the sampling theorem as the fundamental period of the DFS assuming that $v_\Delta >> 1$, giving $F_b(v)$ rather than the $F_{bp}(v)$. The transform can be defined at M interpolation points by a sum over N data samples:

$$F_b(v_m) \approx DFT(v_m) = \Delta x \sum_{n=1}^{N-1} f(x_n) e^{-i2\pi x_m (n\Delta x)} \tag{19}$$

where $v_m$ denotes sample frequencies over the fundamental period of the $F_{bp}(v)$:

$$v_m \in \left[-\frac{1}{2}, +\frac{1}{2}\right] v_\Delta = \left[-\frac{1}{2}, +\frac{1}{2}\right] \Delta x^{-1} \tag{20}$$

For reference, the inverse transform of Equation (19) is $$f(x_m) \approx DFT^{-1}(F) = (M\Delta X)^{-1} \sum_{n=0}^{N-1} F_b(v_n) e^{+i2\pi x_m (n\Delta v)} \tag{21}$$

where $x_\Delta = 1/\Delta v$ is the function spatial period, not to be confused with the function sampling period $\Delta x$.

A one-dimensional phase basis set and aperture can facilitate the visualization. The basis polynomials, $L_k(\hat{v})$, are defined as the set of polynomials orthogonal on the unit one-dimensional rectangular aperture, i.e., with diameter, $D=1$. In order to derive this particular basis set, the system can start with the set of "seed" polynomials, which for simplicity in this example are non-negative integer powers of the spatial frequency variable, $\hat{v}^n$. Then the system generates higher spatial frequency polynomials using the Gram-Schmidt orthogonalization procedure over the interval $$\hat{v} \in \left[-\frac{1}{2}, +\frac{1}{2}\right].$$

Figure 10:
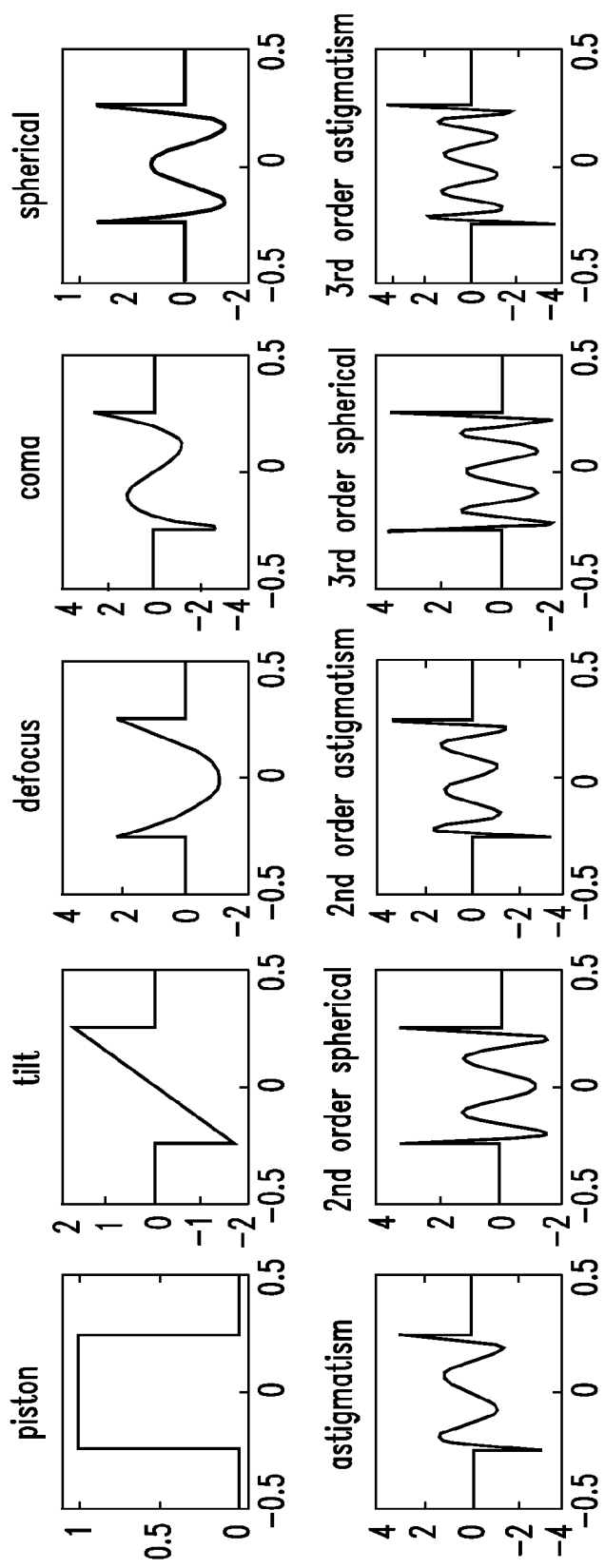
FIG. 10 illustrates a number of example aberration basis functions.

The resulting basis set is listed in Appendix B, noting that the analog of these one dimensional polynomials to their two dimensional Zernike counterparts are listed in FIG. 10 and in Appendix B.

These $\hat{v}^n$ seed polynomials yield the Legendre polynomials when applying the Gram-Schmidt orthogonalization over the interval $\hat{v} \in [-1, 1]$, rather than over $$\overline{v} \in \left[-\frac{1}{2}, +\frac{1}{2}\right].$$

The polynomials defined in Appendix B are not identical to the Legendre polynomials but are closely related since the change of variable, $\hat{v} \rightarrow \hat{v}' = 2\hat{v}$, leads to the familiar form over the interval $\hat{v} \in [-1, 1]$. Exemplary code for generating the polynomials using Wolfram Research's Mathematica™ software is given in Appendix C. The one-dimensional aperture function can be modeled using the rect function: $F_b(\hat{v}) = \text{rect}(\hat{v}, \hat{v}_b)$, with $\hat{v}_b = \frac{1}{2}$ and $$\overline{v} \equiv Dv \in \left[-\frac{1}{2}, +\frac{1}{2}\right],$$

is a dimensionless spatial frequency variable and D is the aperture diameter.

The disclosure now turns to a discussion of the data for $Q>\approx 1$. Given the basis functions defined in Appendix B and the observations above regarding minimal aliasing for the $\text{sinc}(v_b x)$ function, phase retrieval performance can be demonstrated with negligible aliasing for an arbitrary value of $Q>=1$. For example, let $Q=1.06$. The exact value, $Q=1$, is problematic because the replicated copies of the $F_b(v)$ are coincident at this "asymptotic" numerical value, as shown in FIG. 6A. Thus, an interpretation of aliasing is difficult at this value, so Q is confined to values greater than 1 for the present discussion for clarity. Some phase-retrieval approaches use values of $Q<1$. The system can generate a phase with the following algorithm:

$$\varphi(\overline{v}) = \sum_{n=1}^{10} c_n L_n(\overline{v}) \tag{22}$$

by choosing the basis coefficients $c_n$ randomly from a Gaussian distribution and the $L_n(\hat{v})$ correspond to the basis set in Appendix B. The basis coefficients, $c^n$, can be displayed for a single realization and can be used as a consistency check with the phase fitting procedure by applying a least-squares decomposition on this starting phase.

The system can generate irradiance data using this phase realization for the diversity defocus value, $c_3 = 1 \cdot \lambda$ (where $1 \cdot \lambda = 2\pi$, noting that the particular value of $c_3$ can be chosen with some latitude, the goal being to have the image data fill a reasonable portion of the detector. From Appendix C, the quadratic diversity-defocus term is given by $$L_{3,diversity} = \sqrt{5}\left(6\bar{v}^2 - \frac{1}{2}\right) \quad (23)$$

In practice the value for $c_3$ can be chosen to enhance phase-retrieval estimation performance based on the spatial frequency content of $\phi$. Example one-dimensional pupil, phase, and irradiance data for Q=1.06 are calculated and shown in FIGS. 11A and 11B. To specify Q, the system can consider a Nyquist sampled point spread function (PSF) with Airy diameter=4.88 pixels across. When the Nyquist sampling is arbitrarily set to $N_{Nyq}$=512 pixels, for Q≈1.06 the under-sampled data set corresponds to N data pixels:

$$N_{data} = \frac{N_{Nyq}}{(2/Q)} = 272 \text{ pixels} \quad (24)$$

To be consistent with the earlier sinc function examples, the variable x in $\text{sinc}(v_b x)$ applies to the spatial domain (focal plane) while the Fourier domain is labeled using a dimensionless spatial frequency variable in the pupil (as noted in FIG. 10): $F_b(\hat{v}) = \text{rect}(\hat{v}, \hat{v}_b)/\hat{v}_b$. The DFT in Equation (19) can then be used to calculate the irradiance using 272 sample points. The implied number of pupil samples (wavefront) are thus by $N_{pupil}$=256, resulting in the following:

$$Q = \frac{N_{data}}{N_{pupil}} \quad (25)$$

Figure 11A:
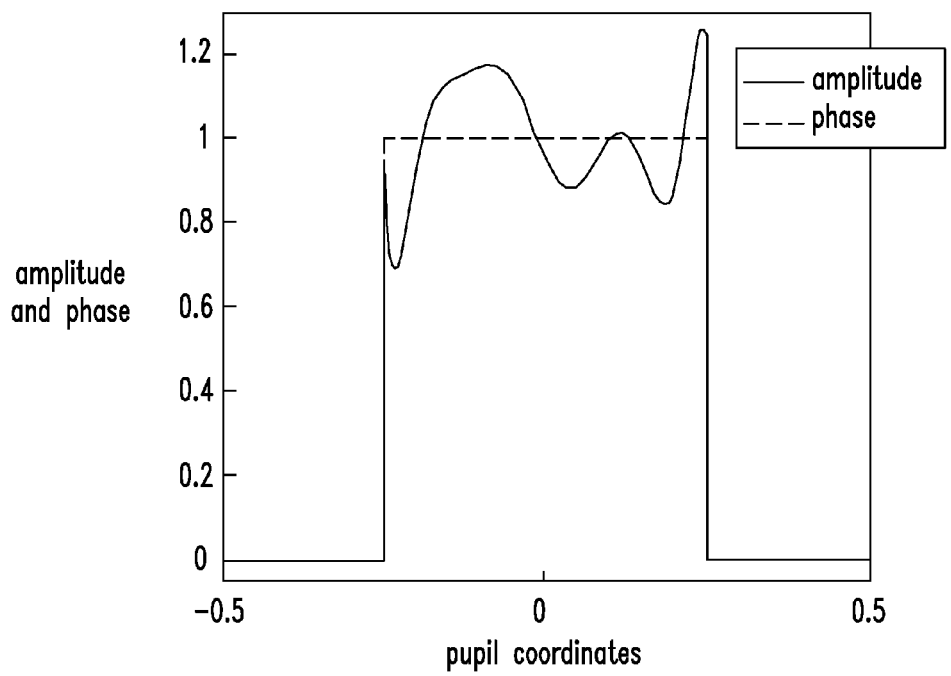
FIGS. 11A and 11B illustrate exemplary pupil, phase, and irradiance data for a 1-d simulation.
Figure 11B:
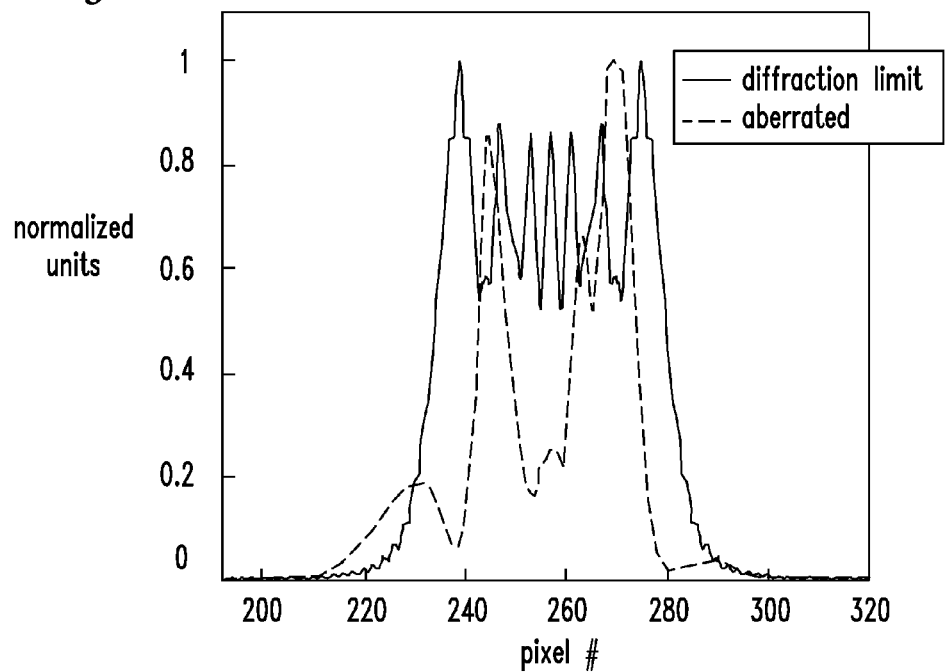

Using the under-sampled irradiance data of FIGS. 11A and 11B as input to the phase-retrieval algorithm, the system executes 200 iterations and compares the output of the phase-retrieval result to the input phase. The true phase coefficients (simulated by the computer algorithm) can be compared to the recovered coefficients using a least-squares decomposition. A small piston term $L_1(\hat{v})$ is recovered, which is characteristic of the iterative-transform approach. The piston term causes a small offset in the true phase compares to the recovered phase, which accounts for the majority of the overall wavefront difference between the two. The root mean square (RMS) difference between the actual and recovered phase values is $$\text{RMS error} = \text{rms}(\phi_{input} - \phi_{output}) \approx 8 \times 10^{-4} \lambda \quad (26)$$

and can be driven to even smaller values with additional iterations, yielding an error term dominated by piston.

The example results discussed herein include no other noise or detector effects and serve mainly to illustrate that no significant limitation prevents the phase-retrieval algorithm from successfully recovering phase values from under-sampled data for Q>=1.

One significant advantage of using discrete Fourier transforms (DFTs) rather than fast Fourier transforms (FFTs) in phase retrieval is that the phase retrieval is performed directly at Q≈1.06. In other words, the DFT calculates the under-sampled model values directly, without the need for further interpolation or modification of the data. This approach can be contrasted to the usual approach to handling under-sampled data in phase retrieval: the data is first interpolated to Nyquist sampling and then the FFTs are implement using minimum pad-sizes that are equal to 2 times the number of pupil samples. In this regard, the DFT provides a more flexible approach, which has the advantage of requiring no modification of the original data values through interpolation. These various data-modifying procedures can introduce spurious and possibly non-physical artifacts into the retrieved phase.

Figure 12:
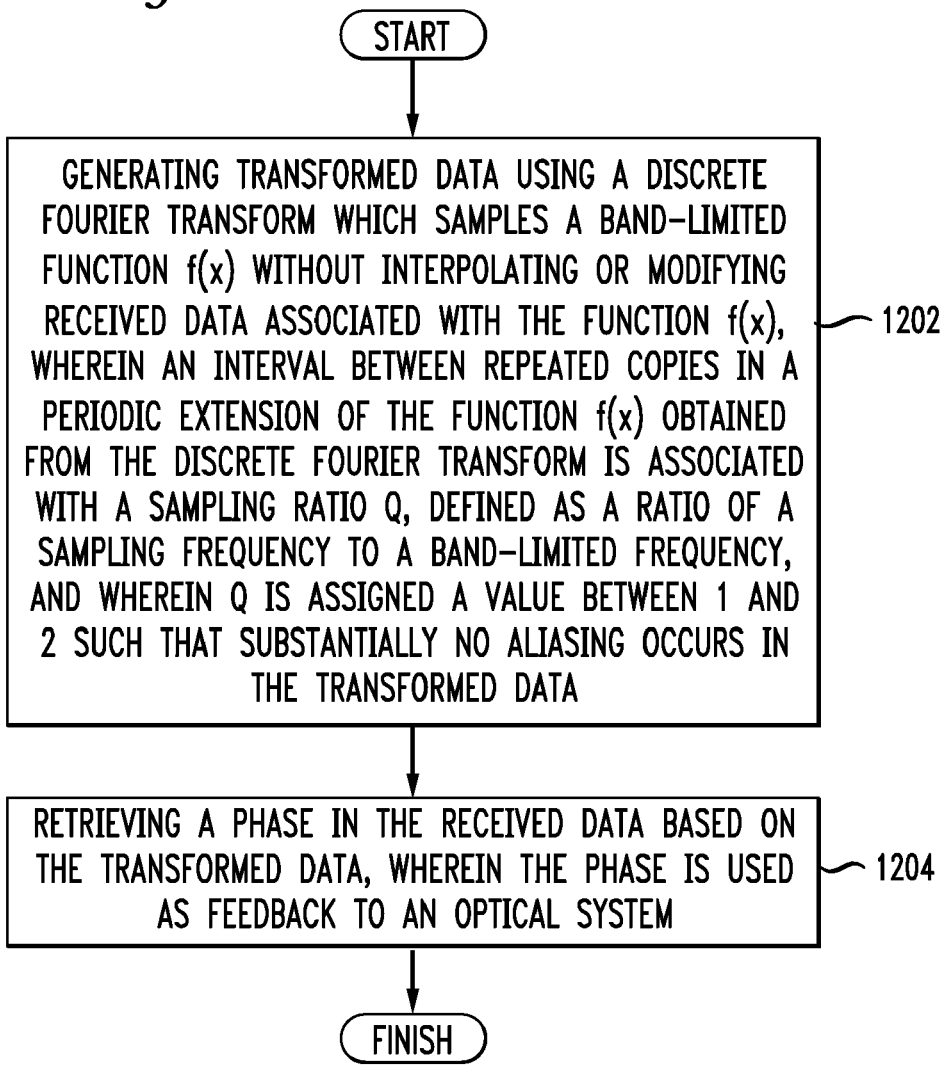
FIG. 12 illustrates a first example method embodiment.

Having disclosed some basic system components, the disclosure now turns to the exemplary method embodiments shown in FIGS. 12 and 13. For the sake of clarity, the methods are discussed in terms of an exemplary system such as is shown in FIG. 1 configured to practice the methods.

FIG. 12 illustrates a first example method embodiment for sampling a band-limited function. The system 100 generates transformed data using a discrete Fourier transform which samples a band-limited function f(x) without interpolating or modifying received data associated with the function f(x), wherein an interval between repeated copies in a periodic extension of the function f(x) obtained from the discrete Fourier transform is associated with a sampling ratio Q, defined as a ratio of a sampling frequency to a band-limited frequency, and wherein Q is assigned a value between 1 and 2 such that substantially no aliasing occurs in the transformed data (1202). The band-limited function can be a sinc(x) function. In one variation, Q=(lambda*f/#)/dx, such that lambda is a monochromatic wavelength of a scalar electromagnetic field, f/# is an f-number of an optical system, and dx is an image plane sampling interval. In one aspect, the received data was collected via a confined circular aperture of diameter D.

The system 100 retrieves a phase in the received data based on the transformed data, wherein the phase is used as feedback to an optical system (1204). The system 100 can further adjust the optical system based on the feedback or the optical system can auto-adjust based on the feedback.

FIG. 13 illustrates an alternative second example method embodiment for sampling a band-limited function. The system 100 receives data such as from an aperture or point source (1302), samples the received data, generating a periodic expansion representation of the received data (1304), sets the Q value between 1 and 2 to avoid aliasing (1306), and retrieves the phase without interpolation and without modification of the original received data (1308).

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the phase retrieval principles disclosed herein can be applied in optical systems metrology, telescope control and alignment, and optical wavefront sensing and control, and is pertinent to adaptive optical systems for astronomical observing, security, and surveillance imaging. Those skilled in the art will readily recognize various modifications and changes that may be made to the principles described herein without following the example embodiments and applications illustrated and described herein, and without departing from the spirit and scope of the disclosure.

APPENDIX A

Periodic Extension by Fourier Series

Periodic Extension of the sampled $\text{sinc}(v_b x)$ transform is accomplished using the Fourier series expansion in Equation (9). Therefore, it is instructive to derive this result as it also helps to illustrate the aliasing errors introduced by the truncation of terms. To begin, multiply Equation (9) by $e^{i2\pi m v/v_\Delta}$ and integrate both sides over one full $F_{bp}(v)$ function period, defined from $-v_\Delta/2$ to $+v_\Delta/2$. Interchanging the order of integration and summation gives $$\int_{-v_\Delta/2}^{+v_\Delta/2} dv F_{bp}(v) e^{i2\pi v(m\Delta x)} = \sum_{n=-\infty}^{+\infty} c_n \int_{-v_\Delta/2}^{+v_\Delta/2} dv e^{i2\pi v(m-n)\Delta x} \quad (A1)$$

then evaluating the right hand side of Equation (A1):

$$v_\Delta \sum_{n=-\infty}^{+\infty} c_n \text{sinc}(m-n) = v_\Delta c_m \quad (A2)$$

Combining Equation (A2) with the left hand side of Equation (A1):

$$c_n = \frac{1}{v_\Delta} \int_{-v_\Delta/2}^{+v_\Delta/2} dv F_{bp}(v) e^{i2\pi n v/v_\Delta} = \frac{1}{v_\Delta} \int_{-v_\Delta/2}^{+v_\Delta/2} dv F_b(v) e^{i2\pi n v/v_\Delta} \quad (A3)$$

using the fact that over a single function period, $F_{bp}(v)=F_b(v)$. But $F_b(v)=\frac{1}{2}=1/v_b$ (from Equation (4)) is only nonzero over $-v_b/2$ to $+v_b/2$, which leads to Equation (15):

$$c_n = \frac{1}{v_\Delta} \int_{-v_\Delta/2}^{+v_\Delta/2} dv \left(\frac{1}{v_b}\right) e^{i2\pi n v/v_\Delta} = \frac{\sin(\pi n/Q)}{\pi n v_b} = \frac{\text{sinc}(n/Q)}{v_\Delta} \quad (A4)$$

The general Fourier series expansion is expressed in the usual form:

$$F_{bp}(v) = \frac{a_0}{2} + \sum_{n=1}^{\infty} [a_n \cos(2\pi n v/v_\Delta) + b_n(\sin(2\pi n v/v_\Delta)] \quad (A5)$$

but because $F_b(v)=\text{rect}(v,v_b)/v_b$ is an even function, it follows that $b_n=0$, $a_n=c_n+c_{-n}=2c_n$ and thus $$a_n = \frac{2}{v_\Delta} \text{sinc}(n/Q), \text{ with } a_0 = \frac{2}{v_\Delta} \quad (A6)$$

Substituting these values into Equation (A5) yields the following equation:

$$F_{bp}(v) = \frac{1}{v_\Delta} + \frac{2}{v_\Delta} \sum_{n=1}^{\infty} \text{sinc}(n/Q) \cos(2\pi n v/v_\Delta) \quad (A7)$$

APPENDIX B

Polynomial Basis Functions

| Term # | Polynomial: $L_k(\hat{v})$: | Zernike Analog |
|---|---|---|
| 1 | 1 | Piston |
| 2 | $\sqrt{3}(2\hat{v})$ | Tilt |
| 3 | $\sqrt{5}\left(6\hat{v}^2 - \frac{1}{2}\right)$ | Defocus |
| 4 | $\sqrt{7}(20\hat{v}^3 - 3\hat{v})$ | Coma |
| 5 | $\sqrt{9}\left(70\hat{v}^4 - 15\hat{v}^2 + \frac{3}{8}\right)$ | Spherical |

-continued

| Term # | Polynomial: $L_k(\hat{v})$: | Zernike Analog |
|---|---|---|
| 6 | $\sqrt{11}\left(252\hat{v}^5 - 70\hat{v}^3 + \frac{15}{4}\hat{v}\right)$ | Astigmatism |
| 7 | $\sqrt{13}\left(924\hat{v}^6 - 315\hat{v}^4 + \frac{105}{4}\hat{v}^2 - \frac{5}{16}\right)$ | $2^{nd}$ order spherical |
| 8 | $\sqrt{15}\left(3432\hat{v}^7 - 1386\hat{v}^5 + \frac{315}{2}\hat{v}^3 - \frac{35}{8}\hat{v}\right)$ | $2^{nd}$ order astigmatism |
| 9 | $\sqrt{17}\left(12780\hat{v}^8 - 6006\hat{v}^6 + \frac{3465}{4}\hat{v}^4 - \frac{315}{8}\hat{v}^2 + \frac{35}{128}\right)$ | $3^{rd}$ order spherical |
| 10 | $\sqrt{19}\left(48620\hat{v}^9 - 25740\hat{v}^7 + \frac{9009}{2}\hat{v}^5 - \frac{1155}{4}\hat{v}^3 + \frac{315}{64}\hat{v}\right)$ | $3^{rd}$ order astigmatism |

APPENDIX C

Wolfram Research's Mathematica™ Code

One Dimensional Basis Functions

Orthonormalized Polynomials $$\varphi[n\_, v\_, v1\_, v2\_] = \frac{\psi[n, v]}{\sqrt{\text{Integrate}[\psi[n, v]^2, \{v, v1, v2\}]}} \frac{\psi[n, v]}{\sqrt{\int_1^2 \psi[n, v]^2 dv}}$$

Intermediate Coefficients $a[i\_, j\_, v\_] = -\text{Integrate}$ $$[u[i, v]\varphi[j, v, v1, v2], \{v, v1, v2\}] - \int_1^2 \frac{u[i, v]\psi[j, v]}{\sqrt{\int_1^2 \psi[j, v]^2 dv}} dv$$

Inner Product $ip[i\_, j\_] = \text{Integrate}[\varphi[i, v, v1, v2]\varphi[j, v, v1, v2], \{v, v1, v2\}]$ $$\int_1^2 \frac{\psi[i, v]\psi[j, v]}{\sqrt{\int_1^2 \psi[i, v]^2 dv}\sqrt{\int_1^2 \psi[j, v]^2 dv}} dv$$

Starting Basis (Assume Weighting Function, W(v)=1)

$u[n\_, v\_] = v^n$

Define the interval (note that for Legendre polynomials: $v_1 = -1$; $v_2 = 1$)

$v1 = -\frac{1}{2}; v2 = \frac{1}{2};$

Calculate Basis:

```
basis = {}; terms = 10;
Do[
  Ψ[m,v] = u[m,v] + Sum[a[m,k,v] φ[k,v,v1,v2],{k,0,m - 1}];
  AppendTo[basis,Collect[φ[m,v,v1,v2],v]],{m,0,terms-1}];
TableForm[basis]
]
```

1

$2\sqrt{3}v$ $-\frac{\sqrt{5}}{2} + 6\sqrt{5}\,v^2$ $-3\sqrt{7}v + 20\sqrt{7}v^3$ $\frac{9}{8} - 45v^2 + 210v^4$ $\frac{15\sqrt{11}\,v}{4} - 70\sqrt{11}\,v^3 + 252\sqrt{11}\,v^5$ $-\frac{5\sqrt{13}}{16} + \frac{105\sqrt{13}\,v^2}{4} - 315\sqrt{13}\,v^4 + 924\sqrt{13}\,v^6$ $-\frac{35\sqrt{15}\,v}{8} + \frac{315\sqrt{15}\,v^3}{2} - 1386\sqrt{15}\,v^5 + 3432\sqrt{15}\,v^7$ $\frac{35\sqrt{17}}{128} - \frac{315\sqrt{17}\,v^2}{8} + \frac{3465\sqrt{17}\,v^4}{4} - 6006\sqrt{17}\,v^6 + 12870\sqrt{17}\,v^8$ $\frac{315\sqrt{19}\,v}{64} - \frac{1155\sqrt{19}\,v^3}{4} + \frac{9009\sqrt{19}\,v^5}{2} - 25740\sqrt{19}\,v^7 + 48620\sqrt{19}\,v^9$ Check Inner Product:

MatrixForm[Table[ip[i,j], {i,0,terms-1}, {j,0,terms-1}]]

$$\begin{pmatrix} 1 & 0 & 0 & 0 & 0 & 0 & 0 & 0 & 0 & 0 \\ 0 & 1 & 0 & 0 & 0 & 0 & 0 & 0 & 0 & 0 \\ 0 & 0 & 1 & 0 & 0 & 0 & 0 & 0 & 0 & 0 \\ 0 & 0 & 0 & 1 & 0 & 0 & 0 & 0 & 0 & 0 \\ 0 & 0 & 0 & 0 & 1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \end{pmatrix}$$

We claim:

1. A method of sampling a band-limited function, the method comprising:

generating transformed data using a discrete Fourier transform which samples a band-limited function f(x) without interpolating or modifying received data associated with the function f(x), wherein an interval between repeated copies in a periodic extension of the function f(x) obtained from the discrete Fourier transform is associated with a sampling ratio Q, defined as a ratio of a sampling frequency to a band-limited frequency, and wherein Q is assigned a value between 1 and 2 such that substantially no aliasing occurs in the transformed data; and retrieving a phase in the received data based on the transformed data.

2. The method of claim 1 wherein the band-limited function is a sinc(x) function.

3. The method of claim 1, wherein Q=(lambda*f/#)/dx and lambda is a monochromatic wavelength of a scalar electromagnetic field, f/# is an f-number of an optical system and dx is an image plane sampling interval.

4. The method of claim 1, wherein the received data is from a confined circular aperture of diameter D.

5. The method of claim 1, further comprising adjusting the optical system based on the feedback.

6. The method of claim 1, wherein the phase is used as feedback to an optical system.

7. A system for sampling a band-limited function, the system comprising:

a processor;

a first processor controlling the processor to generate transformed data using a discrete Fourier transform which samples a band-limited function f(x) without interpolating or modifying received data associated with the function f(x), wherein an interval between repeated copies in a periodic extension of the function f(x) obtained from the discrete Fourier transform is associated with a sampling ratio Q, defined as a ratio of a sampling frequency to a band-limited frequency, and wherein Q is assigned a value between 1 and 2 such that substantially no aliasing occurs in the transformed data; and a second module controlling the processor to retrieve a phase in the received data based on the transformed data.

8. The system of claim 7, wherein the band-limited function is a sinc(x) function.

9. The system of claim 7, wherein Q=(lambda*f/#)/dx and lambda is a monochromatic wavelength of a scalar electromagnetic field, f/# is an f-number of an optical system and dx is an image plane sampling interval.

10. The system of claim 7, wherein the received data is from a confined circular aperture of diameter D.

11. The system of claim 7, further comprising a third module controlling the processor to adjust the optical system based on the feedback.

12. The system of claim 7, wherein the phase is used as feedback to an optical system.

13. A non-transitory computer-readable storage medium storing instructions which, when executed by a computing device, cause the computing device to sample a band-limited function, the instructions comprising:

generating transformed data using a discrete Fourier transform which samples a band-limited function f(x) without interpolating or modifying received data associated with the function f(x), wherein an interval between repeated copies in a periodic extension of the function f(x) obtained from the discrete Fourier transform is associated with a sampling ratio Q, defined as a ratio of a sampling frequency to a band-limited frequency, and wherein Q is assigned a value between 1 and 2 such that substantially no aliasing occurs in the transformed data; and retrieving a phase in the received data based on the transformed data.

14. The non-transitory computer-readable storage medium of claim 13, wherein the band-limited function is a sinc(x) function.

15. The non-transitory computer-readable storage medium of claim 13, wherein Q=(lambda*f/#)/dx and lambda is a monochromatic wavelength of a scalar electromagnetic field, f/# is an f-number of an optical system and dx is an image plane sampling interval.

16. The non-transitory computer-readable storage medium of claim 13, wherein the received data is from a confined circular aperture of diameter D.

17. The non-transitory computer-readable storage medium of claim 13, the instructions further comprising adjusting the optical system based on the feedback.

18. The non-transitory computer-readable storage medium of claim 13, wherein the phase is used as feedback to an optical system.

* * * * *